United States Patent [19]

Filkins

[11] 4,252,334
[45] Feb. 24, 1981

[54] BALANCED WHEELBARROW

[75] Inventor: Steven J. Filkins, Inola, Okla.

[73] Assignee: Benny L. Dirck, Tulsa, Okla. ; a part interest

[21] Appl. No.: 17,813

[22] Filed: Mar. 5, 1979

[51] Int. Cl.³ .............................................. B62B 1/18
[52] U.S. Cl. .................................... 280/47.26; 280/63
[58] Field of Search ............... 280/47.24, 47.26, 47.34, 280/47.35, 63

[56] References Cited

U.S. PATENT DOCUMENTS

| 387,551 | 8/1888 | Arnold | 280/63 UX |
| 521,196 | 6/1894 | Warner et al. | 280/47.24 |
| 1,572,531 | 2/1926 | Henkel | 280/47.26 |
| 2,400,981 | 5/1946 | Dishmaker | 280/63 |
| 2,824,748 | 2/1958 | Schoenberger | 280/47.26 |
| 2,905,482 | 9/1959 | Ruttger | 280/47.24 |

Primary Examiner—John J. Love
Assistant Examiner—Michael Mar
Attorney, Agent, or Firm—Head & Johnson

[57] ABSTRACT

A wheelbarrow having the usual load carrying portion supported by a frame having handles at one end thereof for facilitating manipulation thereof and having a pair of wheels journalled at the opposite end thereof and disposed at planar angles with respect to each other for balancing of the wheelbarrow during transporting thereof, the angularly disposed planes of the wheels diverging inwardly and upwardly whereby the upper rims of the wheels are disposed in closer relation than the lower rims thereof for providing stability and facilitating the turning ability of the wheelbarrow. A brake mechanism is mounted on the frame and cooperates with the wheels for controlling the speed of movement of the wheelbarrow and simultaneously cleaning the wheels, and brake actuating members are provided on the handles for ease of operation of the brakes.

5 Claims, 4 Drawing Figures

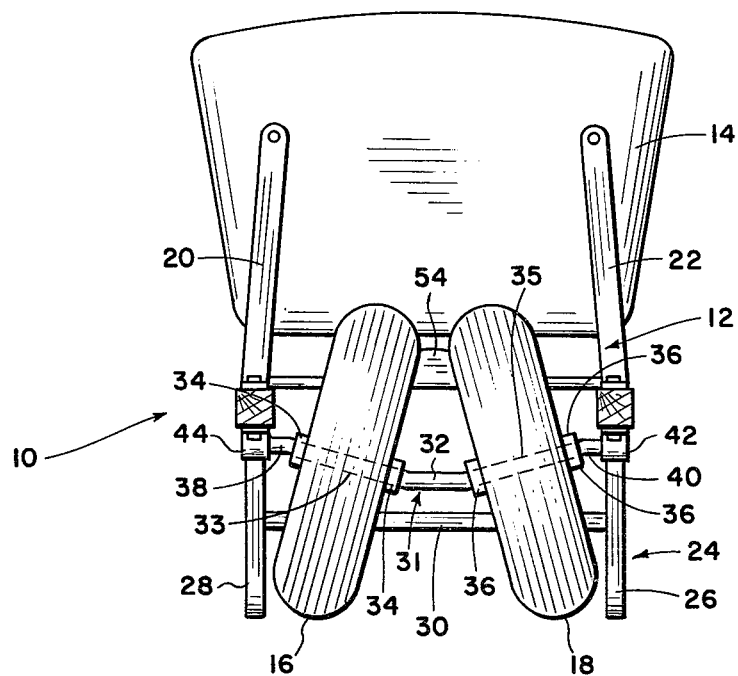
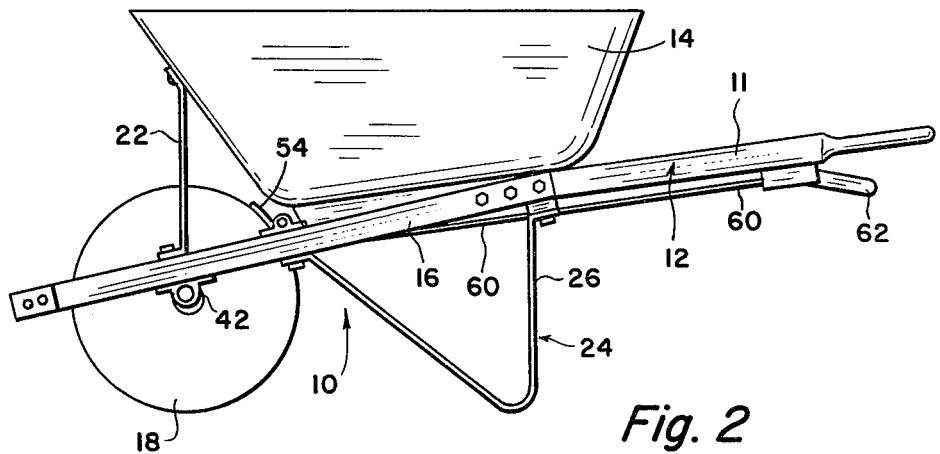

BALANCED WHEELBARROW

BACKGROUND OF THE INVENTION

1. Field of the Invention

This invention relates to improvements in wheelbarrows and more particularly, but not by way of limitation, to a wheel barrow having a pair of inclined wheels for facilitating balancing of the wheelbarrow.

2. Description of the Prior Art

Wheelbarrows have been in widespread use for many years for transporting relatively small loads which may normally be handled manually. The usual wheelbarrow in use today comprises a load carrying container portion supported by a frame having handles at one end thereof and a single wheel journalled at the opposite end thereof whereby the wheelbarrow may be transported for carrying the load from one site to another. The single wheel facilitates the manual handling of the load, but the materials carried in the container frequently shift position therein and the balance of the wheelbarrow shifts, rendering control of the wheelbarrow quite difficult. In addition, turning of the single wheel is frequently difficult, particularly if the load is somewhat heavy. Furthermore, most wheelbarrow in use today do not have any means for braking the movement of the wheel, and thus control of the wheelbarrow and contents may be lost entirely. As a consequence, operation of the normal presently available wheelbarrow by a person of relatively small stature may be extremely difficult, and indeed, even relatively large and powerful persons may encounter difficulties in manipulation of a heavily loaded wheelbarrow.

SUMMARY OF THE INVENTION

The present invention relates to a novel wheelbarrow of a balanced structure which has been particularly designed and constructed for overcoming the foregoing disadvantages. The novel wheelbarrow is provided with the usual load carrying portion or container mounted on a frame having a pair of handles at one end thereof for facilitating manipulation of the wheelbarrow, as is well known. A pair of non-coplanar wheels are journalled at the opposite end of the frame, with the planes of the wheels being inclined inwardly and upwardly whereby forward movement of the wheelbarrow is balanced for stability, and turning of the wheelbarrow is greatly facilitated. In addition, a braking apparatus is provided on the frame for engagement with the wheels in order to provide control of the speed of the wheelbarrow and to facilitate stopping of the movement thereof. The novel braking apparatus not only controls the rotation of the wheels, but also functions for cleaning of the outer periphery of the wheels during a braking operation. A control cable of the Bowden cable type extends along the frame from the braking apparatus to the handles and into connection with hand operable lever means whereby the brakes may be easily actuated during normal use of the wheelbarrow. The novel wheelbarrow is simple and efficient in operation and economical and durable in construction.

BRIEF DESCRIPTION OF THE DRAWINGS

FIG. 1 is a front elevational view of a wheelbarrow embodying the invention.

FIG. 2 is a side elevational view of a wheelbarrow embodying the invention.

DESCRIPTION OF THE PREFERRED EMBODIMENT

Figure 3:
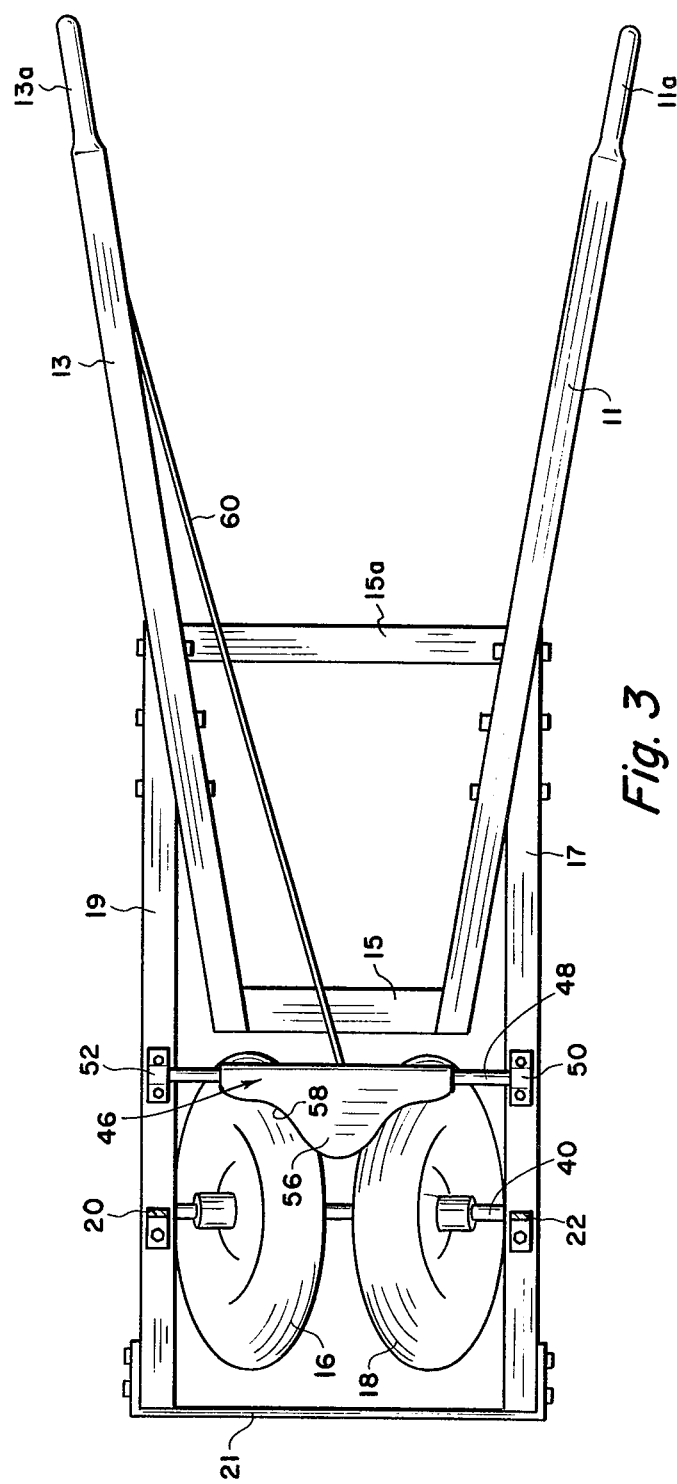
FIG. 3 is a plan view of the frame and wheels of a wheelbarrow embodying the invention, with the load carrying portion omitted for purposes of illustration.

Referring to the drawings in detail, reference character 10 generally indicates a wheelbarrow comprising a frame assembly 12 supporting a container or load carrying portion 14, and having a pair of wheels 16 and 18 journalled at the forward end therefor for facilitating transporting of the wheelbarrow, as is well known. The container 14 may be secured to the frame 12 in any suitable manner, such as bolts, or the like (not shown), and it is preferable to provide a pair of spaced brace members 20 connected between the frame 12 and container 14 for rigidity and strength. In addition, a support assembly 24 is bolted or otherwise secured to the frame 12 for supporting the wheelbarrow 10 in an upright position as is well known. The support assembly 24 may be of any suitable type, and preferably comprises a pair of spaced leg members 26 and 28 of a substantially V-shaped configuration and having a cross member 30 secured therebetween for bracing thereof.

The frame 12 as shown herein preferably comprises a pair of spaced arm members 11 and 13 disposed at angles with respect to each other with the outer ends thereof being disposed at a greater distance apart than the inner ends thereof as particularly shown in FIG. 3. The outer ends 11a and 13a of the arms 11 and 13, respectively, provide handles for facilitating the manipulation of the wheelbarrow 10, as is well known. The inner ends of the arms 11 and 13 are preferably connected by a crossbar 15, and a second crossbar 15a is secured between the arms 11 and 13 in spaced relation with respect to the bar 15 to facilitate support of the container 14, as is well known. A pair of substantially mutually parallel arms 17 and 19 are bolted or otherwise secured to the arms 11 and 13, respectively, and extend forwardly therefrom for supporting the wheels 16 and 18 therebetween in a manner as will be hereinafter set forth. The forward or outer ends of the arms 17 and 19 are connected together by a suitable cross brace 21.

The wheels 16 and 18 are disposed in non-coplanar relation, as particularly shown in FIGS. 1 and 3, with the planes of the wheels being disposed at inwardly and upwardly converging angles. In this manner, the lower portions of the wheels are spaced apart a greater distance than the upper portions thereof whereby a great stability or balance is provided for the wheelbarrow 10 during movement thereof, and turning of the wheelbarrow is greatly facilitated, particularly through a relatively small turning radius. The wheels 16 and 18 are freely journalled on the opposite ends of a pivot shaft generally indicated at 31 in any suitable manner, such as by bearing supports 34 and 36, respectively. The shaft 31 comprises a substantially straight central portion 32 having oppositely disposed angular portions 33 and 35 on the opposite ends thereof, each of which support a wheel. Each angular portion is removably secured to a stub shaft 38 and 40, respectively, in any suitable manner (not shown), and it may be preferable that the connection between the angular portions 33 and 35 and the respective stub shafts 38 and 40 be of a flexible type for facilitating disconnection of the angular portions in the event a wheel is to be removed for any reason. The stub shaft 38 and 40 are secured to the arms 17 and 19 by pillow blocks 42 and 44, or the like. Of course, the wheels may rotate with respect to the angular portions 33 and 35, or the angular portions 33 and 35 may be rotatably secured between the central portion 32 and the respective stub shaft, with the wheels being keyed thereto for rotation simultaneously therewith, if desired.

A brake apparatus generally indicated at 46 is secured to the arms 17 and 19 in the proximity of the wheels 16 and 18 and preferably comprises a shaft 48 disposed between the arms 17 and 19 and having the opposite ends journalled in pillow block bearings 50 and 52, or the like. A braking plate 54 is secured to the shaft 48 for rotation simultaneously therewith and is provided with a pair of oppositely disposed arcuate wheel engaging segments 56 and 58 disposed in substantial alignment with the outer periphery of the wheels 18 and 16, respectively, as will be seen in FIG. 3. The plate 54 normally rests loosely against the outer periphery of the wheels 16 and 18 and functions for cleaning thereof during the normal use of the wheelbarrow 10. However, in the event it is desirable to reduce or completely stop the rotation of the wheels 16 and 18, the plate 54 may be urged firmly against the outer periphery of the wheels 16 and 18 whereby the recesses 56 and 58 will be engaged therewith in a sufficiently great pressure engagement for providing a braking action.

The plate 54 may be actuated by means of a suitable cable 60, such as a Bowden cable, extending from the shaft 48 and along the arm 19 and handle 13 to a hand lever 62 suitably mounted on the handle 13a. The lever 62 may be manually depressed in the usual manner for rotating the shaft 48 in direction to bring the plates 54 in a firm or braking engagement with the wheels 16 and 18 when it is desired to control the rotation of the wheels. When the lever is released, the plate 54 will ride or rest freely against the wheels and function only for cleaning thereof.

Figure 4:
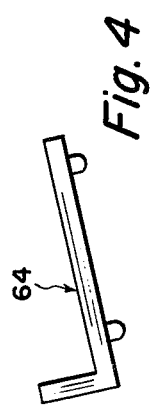
FIG. 4 is a side elevational view of a modified load carrying element which may be utilized with a wheelbarrow embodying the invention.

In the event it is desired to use the wheelbarrow 10 for carrying loads such as brikcs (not shown) or the like, it may be desirable to replace the container 14 with a nod carrier structure 64 as shown in FIG. 4. The container 14 may be removably secured to the frame assembly 12 in any suitable manner for ease or removal, and the hod carrier 64 may be installed in lieu thereof in a similar manner. This provides for greater utility for the wheelbarrow 10.

In use, the wheelbarrow 10 may be loaded with any desired materials, such as sand, dirt, or the like, and may be lifted by the handles 11a and 13a in the usual manner whereby the wheels 16 and 18 may roll across the surface of the ground for transporting the materials from site to site. The balance of the wheels provides extreme ease of movement for the wheelbarrow and compensates for any imbalance of the load carried in the container 14. The turning of the loaded wheelbarrow is easily accomplished due to the inclination of the wheels, and it is found that loads of considerable weight may be easily handled by persons of relatively small stature.

From the foregoing it will be apparent that the present invention provides a novel balance wheelbarrow having a pair of canted wheels mounted thereon, said wheels being in a non-coplanar relationship whereby the stability of the wheelbarrow is greatly increased, and the turning and operational aspects thereof are greatly facilitated. In addition, a novel braking apparatus is provided ror control of the speed of rotation of the wheelbarrow wheels, said braking apparatus being arranged for cleaning the wheels in addition to the braking action.

Whereas the present invention has been described in particular relation to the drawings attached hereto, it should be understood that other and further modifications, apart from those shown or suggested herein may be made within the spirit and scope of this invention.

What is claimed is:

1. A balanced wheelbarrow comprising a frame, a load carrying portion carried by the frame, support means secured to the frame for supporting the wheelbarrow in an upright position, and wheel means journalled on the frame for movement of the wheelbarrow across the surface of the ground, wheel support means comprising an angular pivot shaft secured to the frame means wherein said pivot shaft comprises a centrally disposed horizontal straight portion, an upwardly angled portion provided at each end of the central portion, each of said angled portions having a wheel rotatably journalled thereon, and a horizontal stub shaft formed at the end of each angled portion and secured to said frame, wherein the planes of said wheels converge inwardly and upwardly in a non-coplanar relationship, the outer peripheries of the wheels being positioned a further distance apart at the lower portions than at the upper portions thereof, said cooperating angular relationship between said planes providing stability for the turning thereof in a small turning angle.

2. A balanced wheelbarrow as set forth in claim 1 and including braking means secured between the frame and wheel means for selective control of the speed of rotation of the wheel means and for simultaneously cleaning the wheels during movement of the wheelbarrow.

3. A balanced wheelbarrow as set forth in claim 2 wherein the braking means comprises a braking plate movably secured to the frame for movement between a cleaning position and a braking position with respect to the wheels means, and cable means operably connected with the braking plate for selective action thereof.

4. A balanced wheelbarrow as set forth in claim 1 including a plurality of load carrying portions each adapted to be removably secured to the frame for interchangeability.

5. A balanced wheelbarrow as set forth in claim 4 wherein at least one of said load carrying portions comprises a substantially flat bed portion, and a sidewall extending substantially perpendicularly from said bed portion and along at least one side edge thereof.

* * * * *